(12) United States Patent
Arimoto (10) Patent No.: US 8,237,858 B2
(45) Date of Patent: Aug. 7, 2012

(54) SCANNING LINE INTERPOLATING DEVICE AND SCANNING LINE INTERPOLATION METHOD

(75) Inventor: Katsuyuki Arimoto, Okayama (JP)

(73) Assignee: Panasonic Corporation, Osaka (JP)

( * ) Notice: Subject to any disclaimer, the term of this patent is extended or adjusted under 35 U.S.C. 154(b) by 678 days.

(21) Appl. No.: 12/514,172

(22) PCT Filed: Oct. 26, 2007

(86) PCT No.: PCT/JP2007/070903
§ 371 (c)(1),
(2), (4) Date: May 8, 2009

(87) PCT Pub. No.: WO2008/059704
PCT Pub. Date: May 22, 2008

(65) Prior Publication Data
US 2010/0033623 A1   Feb. 11, 2010

(30) Foreign Application Priority Data
Nov. 14, 2006   (JP) .................................. 2006-308174

(51) Int. Cl.
*H04N 7/01* (2006.01)
*H04N 11/20* (2006.01)
*G06K 9/32* (2006.01)

(52) U.S. Cl. ......... 348/448; 348/452; 382/299; 382/300

(58) Field of Classification Search .................. None
See application file for complete search history.

(56) References Cited

U.S. PATENT DOCUMENTS
2003/0038817 A1\* 2/2003 Kawamura et al. ........... 345/606

FOREIGN PATENT DOCUMENTS
JP   08-023510   1/1996
JP   2002-185934   6/2002
JP   2004-193747   7/2004

OTHER PUBLICATIONS
International Search Report issued Jan. 29, 2008 in the International (PCT) Application of which the present application is the U.S. National Stage.

\* cited by examiner

*Primary Examiner* — Kristine Kincaid
*Assistant Examiner* — James Marandi
(74) *Attorney, Agent, or Firm* — Wenderoth, Lind & Ponack, L.L.P.

(57) ABSTRACT

An interpolation processing section determines a pixel value of an interpolation-target pixel by a diagonal interpolation process. An interpolation value limiting section compensates the pixel value determined by the interpolation processing section such that it becomes a value between pixel values of two adjacent pixels above and below the interpolation-target pixel. An intersection area detecting section judges whether or not the interpolation-target pixel is located in, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects. Depending on a judgment result by the intersection area detecting section, a selecting section selectively outputs a pixel value determined by the interpolation processing section, or a pixel value compensated by the interpolation value limiting section, as an interpolated video signal. By this, the advantageous effect of the diagonal interpolation process is fully exerted while suppressing image quality degradation due to a false operation of the diagonal interpolation process.

8 Claims, 8 Drawing Sheets

|   | 1 | 2 | 3 | 4 | 5 | 6 | 7 | 8 | 9 | 10 | 11 |
|---|---|---|---|---|---|---|---|---|---|----|----|
| A |   |   |   |   |   |   |   |   |   |    |    |
| B |   |   |   |   |   |   |   |   |   |    |    |
| C |   |   |   |   |   |   |   |   |   |    |    |

FIG. 13C    PRIOR ART

|   | 1 | 2 | 3 | 4 | 5 | 6 | 7 | 8 | 9 | 10 | 11 |
|---|---|---|---|---|---|---|---|---|---|----|----|
| A |   |   |   |   |   |   |   |   |   |    |    |
| B |   |   |   |   |   |   |   |   |   |    |    |
| C |   |   |   |   |   |   |   |   |   |    |    |

SCANNING LINE INTERPOLATING DEVICE AND SCANNING LINE INTERPOLATION METHOD

TECHNICAL FIELD

The current invention relates to a scanning line interpolating device and a scanning line interpolation method, both of which are for conducting a scanning line interpolation process.

BACKGROUND ART

Conventionally, among scanning line interpolating devices for conducting a scanning line interpolation process that converts an interlaced scanned video signal into a progressively scanned video signal and the like, there have been scanning line interpolating devices, which have a function of determining the pixel value of an interpolation-target pixel based on correlation of at least two pixels located in a diagonal direction from the interpolation-target pixel (hereinafter, referred to as diagonal interpolation function). With the scanning line interpolating devices having a diagonal interpolation function, a diagonal edge can be properly reproduced.

Among the scanning line interpolating devices having the diagonal interpolation function as described above, in order to suppress image quality degradation which occurs when a false operation of the diagonal interpolation process happens, there are those that compensate a pixel value such that a pixel value falls within an interval between the pixel values of the adjacent pixels located above and below, when the pixel value determined by the diagonal interpolation process is beyond the interval between the pixel values of the adjacent pixels located above and below (refer patent document 1 as an example).

Patent document 1: Japanese Laid-Open Patent Publication No. 2002-185934

Figure 10:
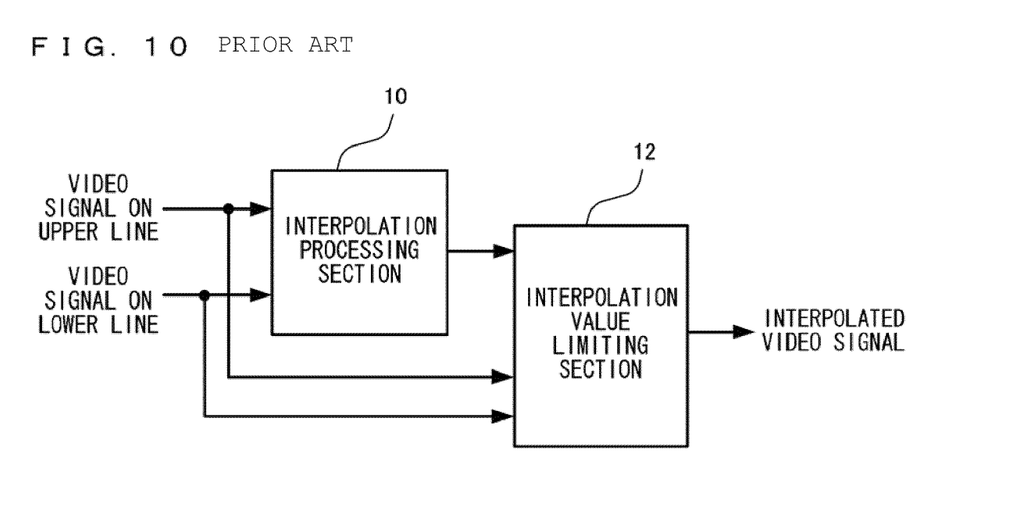
FIG. 10 is a block diagram showing a configuration of a conventional scanning line interpolating device.

FIG. 10 is a block diagram of a configuration of a conventional scanning line interpolating device that includes a function of compensating a pixel value determined by the diagonal interpolation process as described above.

In FIG. 10, an interpolation processing section 10 determines a pixel value of an interpolation-target pixel based on correlation of two pixels located in a diagonal direction from the interpolation-target pixel, based on a video signal of a scanning line just above the interpolation-target pixel (hereinafter, referred to as video signal on the upper line) and a video signal of a scanning line just below the interpolation-target pixel (hereinafter, referred to as video signal on the lower line).

An interpolation value limiting section 12 judges whether or not the pixel value determined by the interpolation processing section 10 is beyond the interval between the pixel values of the adjacent pixels located above and below the interpolation-target pixel, based on: the pixel value determined by the interpolation processing section 10, and the video signal on the upper line and the video signal on the lower line. When the pixel value determined by the interpolation processing section 10 is beyond the interval between the pixel values of the adjacent pixels located above and below the interpolation-target pixel, the interpolation value limiting section 12 compensates the pixel value determined by the interpolation processing section 10 such that the pixel value determined by the interpolation processing section 10 falls within the interval between the pixel values of the adjacent pixels above and below, and outputs the compensated pixel value as a compensated video signal. When the pixel value determined by the interpolation processing section 10 is not beyond the interval between the pixel values of the adjacent pixels located above and below the interpolation-target pixel, the interpolation value limiting section 12 outputs the pixel value determined by the interpolation processing section 10 as a compensated video signal without compensation.

Figure 11:
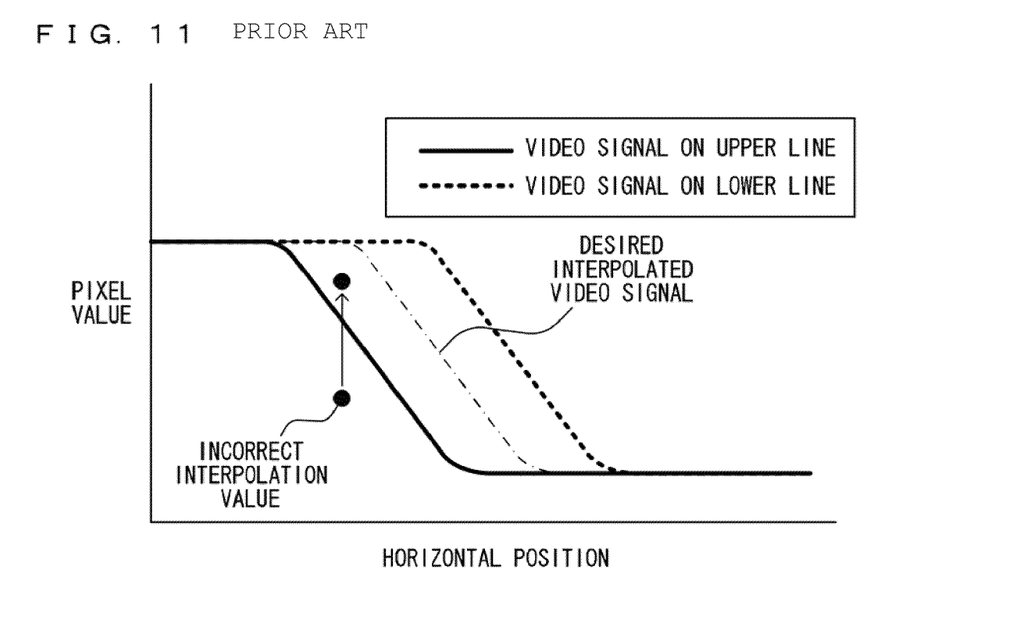
FIG. 11 is a diagram for describing an operation of the conventional scanning line interpolating device when a video signal with a diagonal edge is inputted.

FIG. 11 shows, with regard to a video signal having a diagonal edge (color boundary line in a diagonal direction), a relation between video signals on the upper line and on the lower line, and a desired interpolated video signal. Here, when a pixel value beyond the interval between the pixel values of the adjacent pixels located above and below the interpolation-target pixel (e.g. "incorrect interpolation value" in FIG. 11) is outputted from the interpolation processing section 10 due to a false operation of the diagonal interpolation process, this pixel value is compensated by the interpolation value limiting section 12 so as to fall within the interval between the pixel values of the adjacent pixels above and below the interpolation-target pixel as shown by an arrow in FIG. 11 (e.g. compensated to an average of pixel values of the adjacent pixels above and below the interpolation-target pixel). In this way, since an incorrect interpolation value is compensated so as to approach a desired interpolation value, it is possible to suppress image quality degradation that occurs when a false operation of the diagonal interpolation process happens.

SUMMARY OF THE INVENTION

Problems to be Solved by the Invention

However, observation and research by the inventors of the current invention revealed that with a conventional scanning line interpolating device shown in FIG. 10, the advantageous effect of the diagonal interpolation process is not exerted in a specific case.

Figure 12:
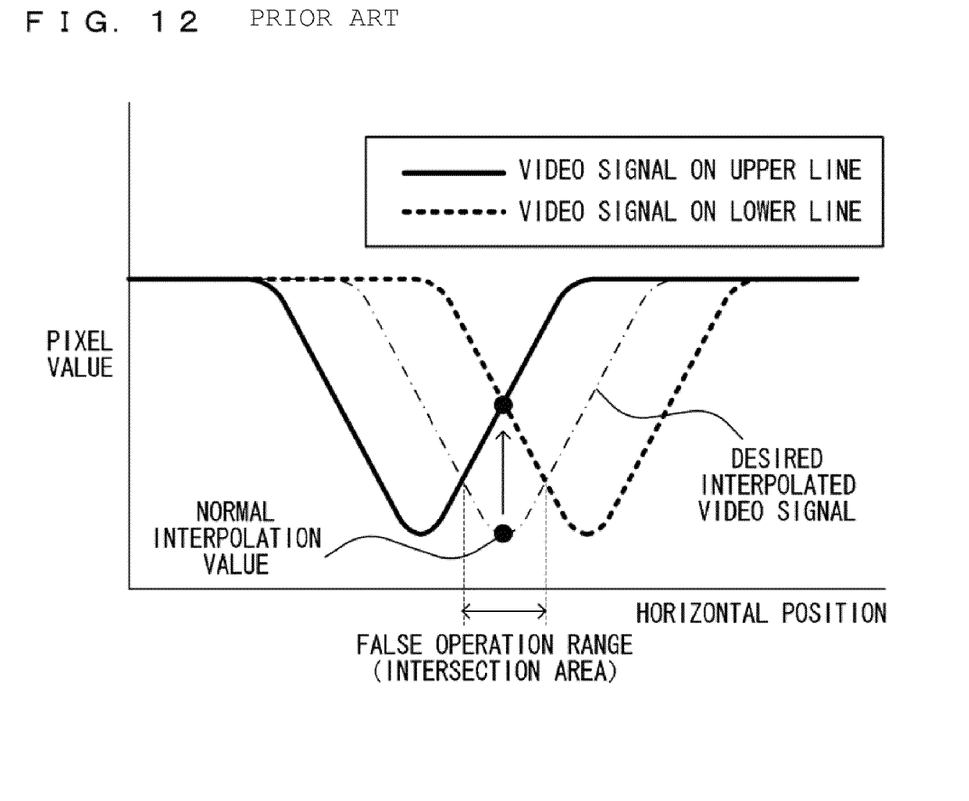
FIG. 12 is a diagram for describing an operation of the conventional scanning line interpolating device when a video signal with a diagonal line is inputted.

FIG. 12 shows, with regard to a video signal having a diagonal line (which points to a fine line in a diagonal direction, and which is different from the diagonal edge that is described above), a relation between video signals on the upper line and on the lower line, and a desired interpolated video signal. In this case, one part of the curve line representing a desired interpolated video signal is beyond the interval between the pixel values of the adjacent pixels located above and below the interpolation-target pixel. Therefore, with regard to this part (the part described as "false operation interval" in FIG. 12), even when a correct pixel value is outputted from the interpolation processing section 10, a pixel value is incorrectly compensated by the interpolation value limiting section 12 so as to fall within the interval of pixel values of the adjacent pixels above and below the interpolation-target pixel, as shown by an arrow in FIG. 12.

Figure 13A:
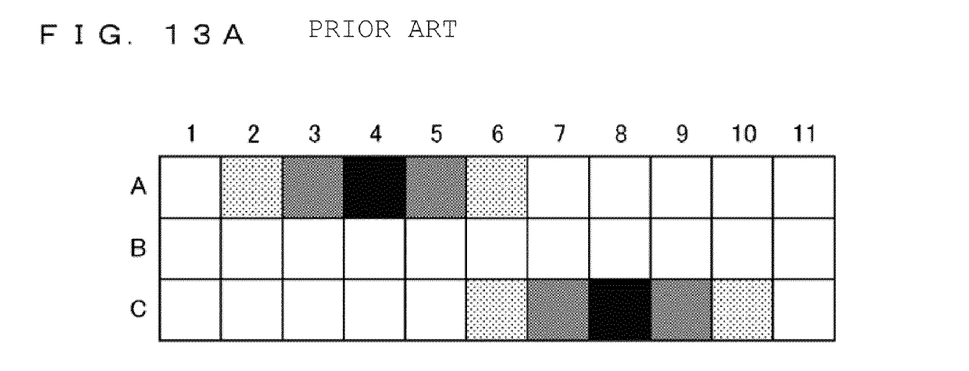
FIG. 13A is a diagram for describing an operation of the conventional scanning line interpolating device.
Figure 13B:
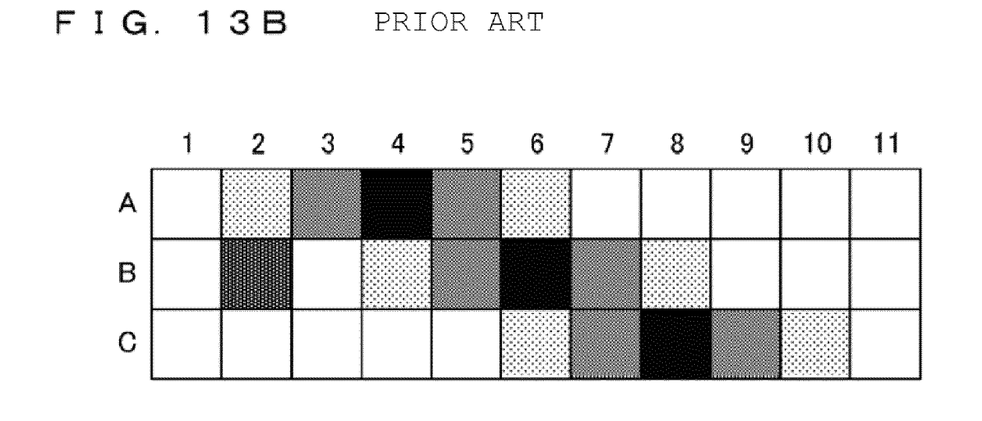
FIG. 13B is a diagram for describing an operation of the conventional scanning line interpolating device.
Figure 13C:
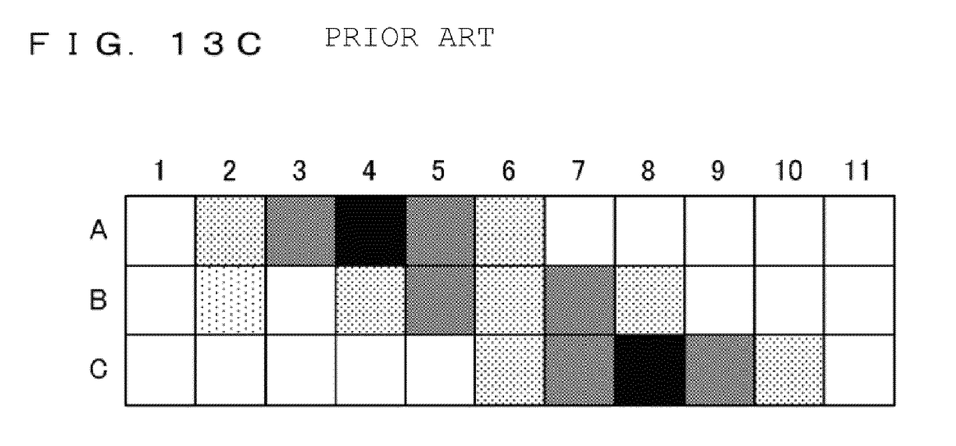
FIG. 13C is diagram for describing an operation of the conventional scanning line interpolating device.

As a specific example, a case is described in which a video signal of a scanning line B (interpolated video signal) is generated by a scanning line interpolation process, based on a video signal of a scanning line A (video signal on the upper line) and a video signal of a scanning line C (video signal on the lower line), as both shown in FIG. 13A. The scanning line B in FIG. 13B shows pixel values outputted by the interpolation processing section 10. Here, it is assumed that the pixel value of pixel B2 is an incorrect value due to a false operation of the diagonal interpolation process, and other pixel values are correct values. The scanning line B in FIG. 13C shows pixel values outputted by the interpolation value limiting section 12. The pixel value of pixel B2 approaches an ideal value, since the pixel value of pixel B2 is compensated by the interpolation value limiting section 12 so as to fall within the interval between the pixel values of the adjacent pixels above and below pixel B2 (i.e. pixel A2 and pixel C2). However, the pixel value of pixel B6 is incorrectly compensated by the interpolation value limiting section 12 so as to fall within the interval between the pixel values of the adjacent pixels above and below pixel B6 (i.e. pixel A6 and pixel C6). As a result, as shown in FIG. 13C, the diagonal line is not correctly interpolated.

Therefore, the objective of the current invention is to provide a scanning line interpolating device and a scanning line interpolation method, which are both able of fully exerting the advantageous effect of a diagonal interpolation process while suppressing image quality degradation due to a false operation of the diagonal interpolation process.

Solution to the Problems

In order to achieve the objective described above, the current invention adopts the following configuration. The reference labels in parenthesis merely show one example of a correspondence relationship with drawings in order to aid understanding of the current invention, and do not limit the scope of the current invention in any way.

A scanning line interpolating device of the current invention includes: interpolation processing means (10) for determining the pixel value of an interpolation-target pixel (Pi) based on pixel values of at least two pixels located in a diagonal direction from the interpolation-target pixel; interpolation value limiting means (12) for compensating the pixel value determined by the interpolation processing means such that the pixel value of the interpolation-target pixel becomes a value between pixel values of two adjacent pixels above and below the interpolation-target pixel, when the pixel value determined by the interpolation processing means is outside the interval between pixel values of two adjacent pixels (Pu, Pd) above and below the interpolation-target pixel; and false operation preventing means (14, 16) for preventing false operations of the interpolation value limiting means by selectively outputting, the pixel value determined by the interpolation processing means or the pixel value compensated by the interpolation value limiting means, as an interpolated video signal, based on the pixel value of a pixel on the scanning line above the interpolation-target pixel, and the pixel value of a pixel on the scanning line below the interpolation-target pixel.

The false operation preventing means further includes: intersection area detecting means (14) for judging whether or not the interpolation-target pixel is located in an intersection area which is, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects; and selecting means (16) for, depending on the judgment result of the intersection area detecting means, outputting, as an interpolated video signal, a pixel value compensated by the interpolation value limiting means when the interpolation-target pixel is judged not to be located in the intersection area, and for outputting, as an interpolated video signal a pixel value determined by the interpolation processing means when the interpolation-target pixel is judged to be located in the intersection area.

The intersection area detecting means may judge whether: the sign of a first subtraction result value (L), which is a value resulting from subtracting the pixel value of a second pixel (Pdl) located on the scanning line below the interpolation-target pixel and in a horizontal position identical to that of a first pixel, from the pixel value of the first pixel (Pul) located on the scanning line above the interpolation-target pixel and on the left side of the interpolation-target pixel; and the sign of a second subtraction result value (R), which is a value resulting from subtracting the pixel value of a fourth pixel (Pdr) located on the scanning line below the interpolation-target pixel and in a horizontal position identical to that of a third pixel, from the pixel value of the third pixel (Pur) located on the scanning line above the interpolation-target pixel and on the right side of the interpolation-target pixel; are identical or not, and may judge that the interpolation-target pixel is not located in the intersection area if the sign of the first subtraction result value and the sign of the second subtraction result value are identical.

The intersection area detecting means may judge that the interpolation-target pixel is located in the intersection area; if the sign of the first subtraction result value and the sign of the second subtraction result value are different, and if the absolute value of the first subtraction result value and the absolute value of the second subtraction result value are both equal to or more than a first threshold which is larger than 0.

The intersection area detecting means may judge that the interpolation-target pixel is located in the intersection area; if the sign of the first subtraction result value and the sign of the second subtraction result value are different, and if the absolute value of the first subtraction result value and the absolute value of the second subtraction result value are both equal to or more than a first threshold which is larger than 0; and if the absolute value of the difference between the first pixel and the third pixel and the absolute value of the difference between the second pixel and the fourth pixel are both equal to or more than a second threshold which is larger than 0.

The false operation preventing means may include: diagonal line detecting means for judging whether a diagonal line and not a diagonal edge exists in the proximity of the interpolation-target pixel; and a selecting means for, depending on the detection result of the diagonal line detecting means, outputting, as an interpolated video signal, a pixel value compensated by the interpolation value limiting means when the interpolation-target pixel is judged not to have a diagonal line in the proximity, and for outputting, as an interpolated video signal, a pixel value determined by the interpolation processing means when the interpolation-target pixel is judged to have a diagonal line in the proximity.

A scanning line interpolation method of the current invention includes: an interpolation processing step of determining the pixel value of an interpolation-target pixel (Pi) based on pixel values of at least two pixels located in a diagonal direction from the interpolation-target pixel; an interpolation value limiting step of compensating the pixel value determined at the interpolation processing step such that the pixel value of the interpolation-target pixel becomes a value between pixel values of two adjacent pixels above and below the interpolation-target pixel, when the pixel value determined at the interpolation processing step is outside the interval between pixel values of two adjacent pixels (Pu, Pd) above and below the interpolation-target pixel; and a false operation preventing step of preventing false operations at the interpolation value limiting step by selectively outputting, the pixel value determined at the interpolation processing step or the pixel value compensated at the interpolation value limiting step, as an interpolated video signal, based on the pixel value of a pixel on the scanning line above the interpolation-target pixel, and the pixel value of a pixel on the scanning line below the interpolation-target pixel.

The false operation preventing step may further include: an intersection area detecting step of judging whether or not the interpolation-target pixel is located in an intersection area which is, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects; and a selecting step of, depending on the judgment result of the intersection area detecting step, outputting, as an interpolated video signal, a pixel value compensated by the interpolation value limiting means when the interpolation-target pixel is judged not to be located in the intersection area, and for outputting, as an interpolated video signal, a pixel value determined by the interpolation processing means when the interpolation-target pixel is judged to be located in the intersection area.

At the intersection area detecting step, it may be judged that whether: the sign of a first subtraction result value (L), which is a value resulting from subtracting the pixel value of a second pixel (Pdl) located on the scanning line below the interpolation-target pixel and in a horizontal position identical to that of a first pixel, from the pixel value of the first pixel (Pul) located on the scanning line above the interpolation-target pixel and on the left side of the interpolation-target pixel; and the sign of a second subtraction result value (R), which is a value resulting from subtracting the pixel value of a fourth pixel (Pdr) located on the scanning line below the interpolation-target pixel and in a horizontal position identical to that of a third pixel, from the pixel value of the third pixel (Pur) located on the scanning line above the interpolation-target pixel and on the right side of the interpolation-target pixel; are identical or not, and may be judged that the interpolation-target pixel is not located in the intersection area if the sign of the first subtraction result value and the sign of the second subtraction result value are identical.

At the intersection area detecting step, it may be judged that the interpolation-target pixel is located in the intersection area; if the sign of the first subtraction result value and the sign of the second subtraction result value are different, and if the absolute value of the first subtraction result value and the absolute value of the second subtraction result value are both equal to or more than a first threshold which is larger than 0.

At the intersection area detecting step, it may be judged that the interpolation-target pixel is located in the intersection area; if the sign of the first subtraction result value and the sign of the second subtraction result value are different, and if the absolute value of the first subtraction result value and the absolute value of the second subtraction result value are both equal to or more than a first threshold which is larger than 0; and if the absolute value of the difference between the first pixel and the third pixel and the absolute value of the difference between the second pixel and the fourth pixel are both equal to or more than a second threshold which is larger than 0.

The false operation preventing step may include: a diagonal line detecting step of judging whether a diagonal line not a diagonal edge exists in the proximity of the interpolation-target pixel; and a selecting step of, depending on the detection result at the diagonal line detecting step, outputting, as an interpolated video signal, a pixel value compensated at the interpolation value limiting step when the interpolation-target pixel is judged not to have a diagonal line in the proximity, and for outputting, as an interpolated video signal, a pixel value determined at the interpolation processing step when the interpolation-target pixel is judged to have a diagonal line in the proximity.

Effect of the Invention

According to the current invention, a scanning line interpolating device and a scanning line interpolation method, which are both able of fully exerting the advantageous effect of a diagonal interpolation process while suppressing image quality degradation due to a false operation of the diagonal interpolation process, can be provided.

DESCRIPTION OF THE REFERENCE CHARACTERS 10 interpolation processing section
12 interpolation value limiting section
14 intersection area detecting section
16 selecting section
101 angle-correlation detecting section
102 diagonal interpolation processing section
103 vertical interpolation processing section 104 mixing section

DETAILED DESCRIPTION OF THE INVENTION

Figure 1:
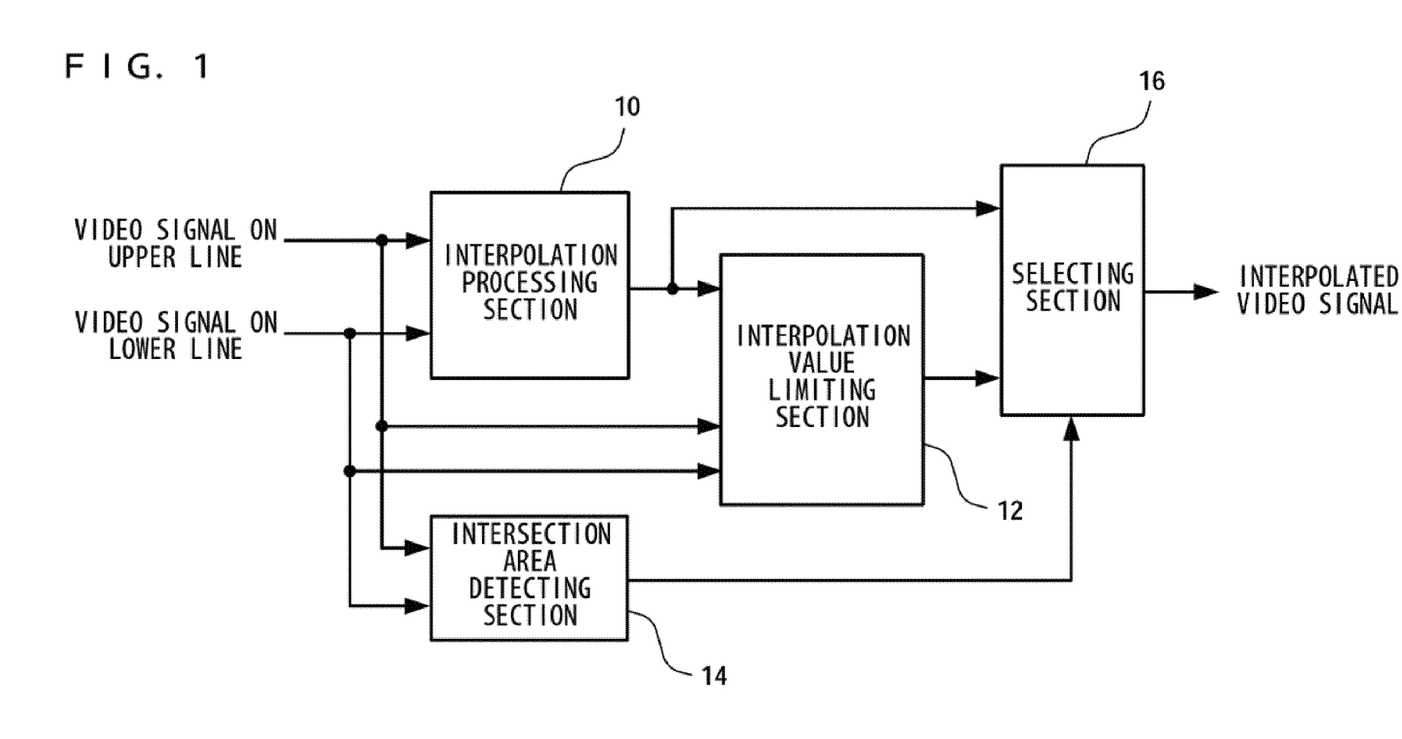
FIG. 1 is a block diagram showing a configuration of a scanning line interpolating device according to the first embodiment of the current invention.

FIG. 1 is a block diagram showing a configuration of a scanning line interpolating device according to one embodiment of the current invention.

In FIG. 1, a scanning line interpolating device includes: an interpolation processing section 10, an interpolation value limiting section 12, an intersection area detecting section 14, and a selecting section 16.

The interpolation processing section 10 determines a pixel value of an interpolation-target pixel based on correlation of two pixels located in a diagonal direction from the interpolation-target pixel, based on a video signal on the upper line and a video signal on the lower line.

An interpolation process based on correlation of two pixels located in a diagonal direction from the interpolation-target pixel as described above is a commonly known technology, and various methods have been conceived as a diagonal interpolation process method in the past. The interpolation processing section 10 may use any of such methods.

Figure 2:
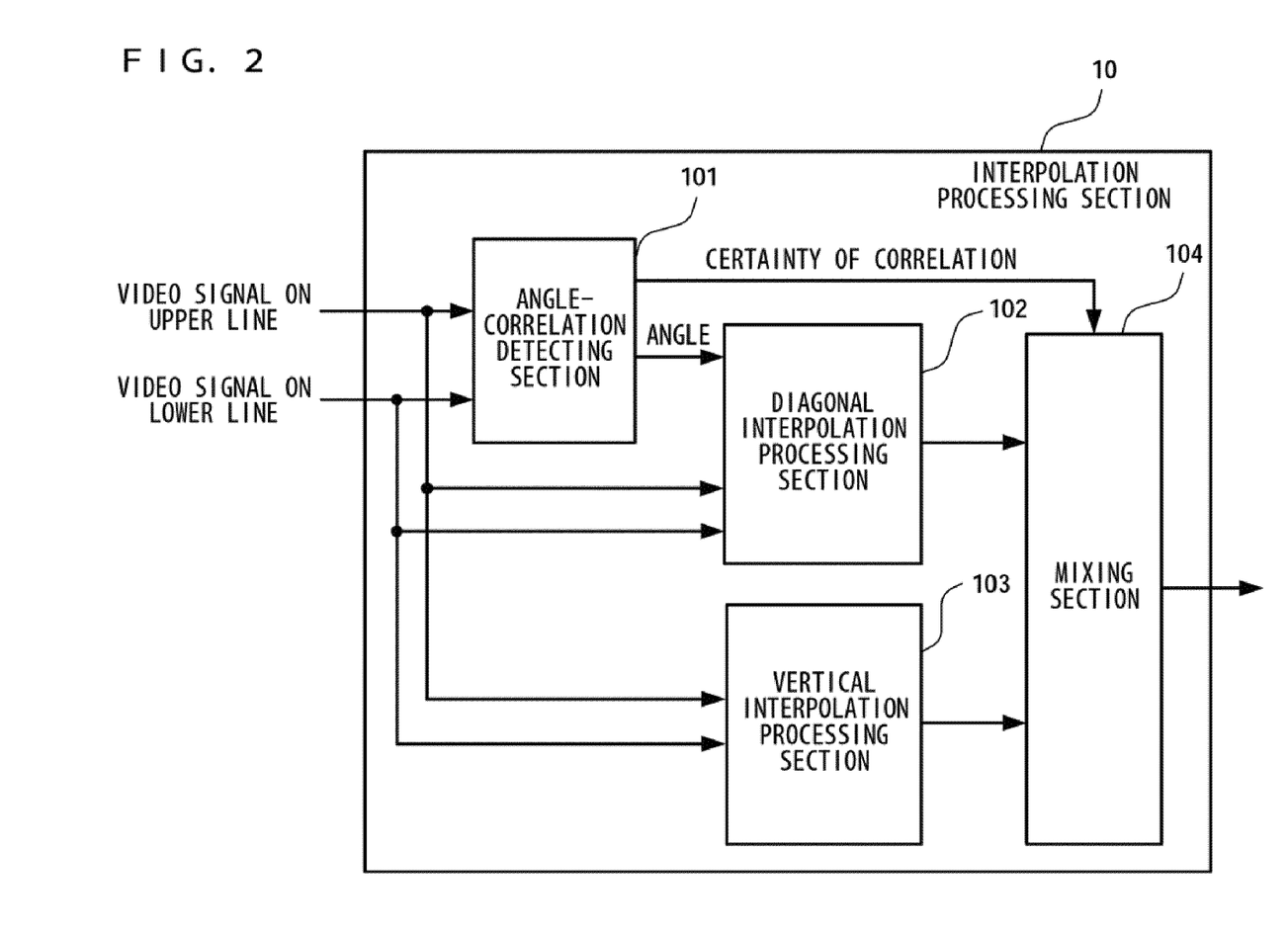
FIG. 2 is a block diagram showing one example of a configuration of interpolation processing section 10.

FIG. 2 shows one example of a configuration of the interpolation processing section 10. In FIG. 2, an angle-correlation detecting section 101 detects an angle of a diagonal edge or a diagonal line, based on correlation of two pixels located in a diagonal direction from the interpolation-target pixel; and calculates the certainty of correlation of two pixels corresponding to a detected angle. A diagonal interpolation processing section 102 determines the pixel value of the interpolation-target pixel based on pixel values of two pixels that correspond to the angle detected by the angle-correlation detecting section 101. A vertical interpolation processing section 103 determines the pixel value of the interpolation-target pixel based on pixel values of adjacent two pixels above and below the interpolation-target pixel. A mixing section 104 mixes an interpolation value (diagonal interpolation value) obtained by the diagonal interpolation processing section 102 and an interpolation value (vertical interpolation value) obtained by the vertical interpolation processing section 103, in a ratio that depends on the certainty of correlation calculated by the angle-correlation detecting section 101. Any commonly known calculation method may be used as the calculation method for the certainty of correlation. For example, as in the above-described patent document 1, depending on the absolute value of the difference between pixel values of two pixels in a diagonal direction, which absolute value is used as a certainty of correlation of two pixels that corresponds to the detected angle; the diagonal interpolation value and the vertical interpolation value may be mixed.

The interpolation value limiting section 12 judges whether or not the pixel value determined by the interpolation processing section 10 is beyond the interval between the pixel values of the adjacent pixels located above and below the interpolation-target pixel, based on the pixel value determined by the interpolation processing section 10, and the video signal on the upper line and the video signal on the lower line. When the pixel value determined by the interpolation processing section 10 is beyond the interval between the pixel values of the adjacent pixels located above and below the interpolation-target pixel, the interpolation value limiting section 12 compensates and outputs the pixel value determined by the interpolation processing section 10 such that the pixel value of the interpolation-target pixel falls within the interval between the pixel values of the adjacent pixels above and below. When the pixel value determined by the interpolation processing section 10 is not beyond the interval between the pixel values of the adjacent pixels located above and below the interpolation-target pixel, the interpolation value limiting section 12 outputs the pixel value determined by the interpolation processing section 10 without compensation.

The intersection area detecting section 14 and the selecting section 16 function as false operation preventing means for preventing false operations of the interpolation value limiting section 12 as shown in FIG. 12, by selectively outputting, the pixel value determined by the interpolation processing section 10 or the pixel value compensated by the interpolation value limiting section 12, as an interpolated video signal, based on the pixel value of the pixel on the scanning line above the interpolation-target pixel and the pixel value of the pixel on the scanning line below the interpolation-target pixel.

The intersection area detecting section 14: judges whether or not the interpolation-target pixel is located in, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects (which corresponds to the false operation interval in FIG. 12. Hereinafter, this area is referred to as intersection area); and outputs a signal representing this judgment result. Specific operation of the intersection area detecting section 14 will be described later.

The selecting section 16: selects either the pixel value outputted from the interpolation processing section 10 or the pixel value outputted from the interpolation value limiting section 12, depending on a judgment result of the intersection area detecting section 14; and outputs it as an interpolated video signal. More specifically, when it is judged that the interpolation-target pixel is not located in the intersection area by the intersection area detecting section 14, the selecting section 16 outputs the pixel value outputted from the interpolation value limiting section 12 as an interpolated video signal; and when it is judged that the interpolation-target pixel is located in the intersection area by the intersection area detecting section 14, the selecting section 16 outputs the pixel value outputted from the interpolation processing section 10 as an interpolated video signal.

With such configuration, the interpolation-target pixel located in the intersection area is excluded from being a target of the interpolation value limiting section 12 for processing; while other interpolation-target pixel becomes a target of the interpolation value limiting section 12 for processing. Therefore, the advantageous effect of the diagonal interpolation process is fully exerted, while suppressing image quality degradation due to a false operation of the diagonal interpolation process.

Figure 3:
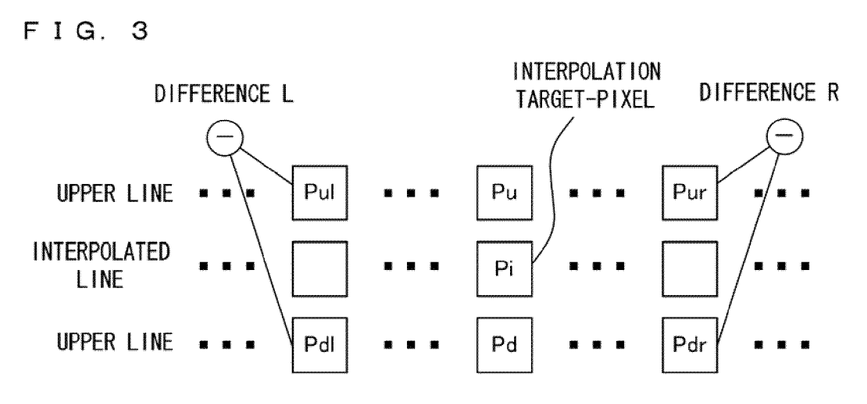
FIG. 3 is a diagram for describing an operation of an intersection area detecting section 14.

Described in the following is a specific operation of the intersection area detecting section 14 in reference to FIG. 3.

The intersection area detecting section 14 calculates a difference L by subtracting the pixel value of pixel Pdl that is the m-th pixel on the left side from pixel Pd, from the pixel value of pixel Pul which is the m-th (m is a natural number) pixel on the left side from pixel Pu which is just above the interpolation-target pixel Pi. Similarly, a difference R is calculated by subtracting the pixel value of pixel Pdr which is the n-th pixel on the right side from pixel Pd, from the pixel value of pixel Pur which is the n-th (n is a natural number) pixel on the right side from pixel Pu which is just above the interpolation-target pixel Pi. Additionally, the intersection area detecting section 14 judges whether the signs of the calculated difference L and difference R are identical or not; and if both signs are identical, judges that the interpolation-target pixel Pi is not located in the intersection area, and if both signs are different, judges that the interpolation-target pixel Pi is located in the intersection area. As a footnote, m and n may be identical values or different values. An optimum value may be adopted as the values for m and n in accordance with the format of the video signal, the configuration of the interpolation processing section 10, and the like. Furthermore, the values of m and n may be altered adaptively in accordance with the angle detected by angle-correlation detecting section 101 in FIG. 2.

Figure 4:
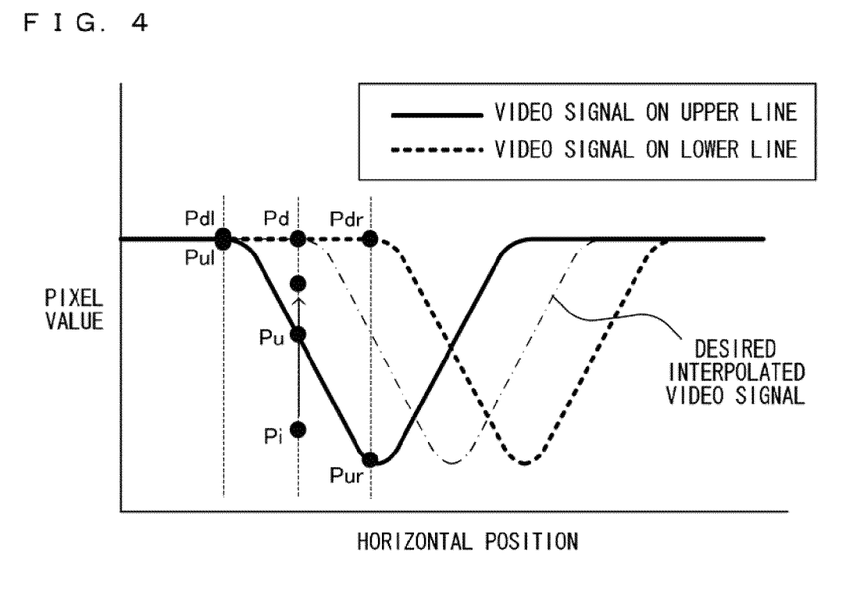
FIG. 4 is a diagram for describing an operation of the scanning line interpolating device when an interpolation-target pixel Pi is not located in an intersection area.

FIG. 4 shows, with regard to a video signal having a diagonal line, a relation between video signals on the upper line and on the lower line, and a desired interpolated video signal. The horizontal axis indicates a horizontal position of a pixel, and the vertical axis indicates a pixel value. As a matter of convenience, a video signal is represented as a continuous curve line in FIG. 4. In the example in FIG. 4, the sign of the difference L (i.e. the value resulting from subtracting the pixel value of pixel Pdl from the pixel value of pixel Pul) is negative, and the sign of the difference R (i.e. the value resulting from subtracting the pixel value of pixel Pdr from the pixel value of pixel Pur) is also negative. Therefore, the intersection area detecting section 14 judges that the interpolation-target pixel Pi is not located in the intersection area, and as a result, the pixel value outputted from the interpolation value limiting section 12 (i.e. a pixel value compensated such that it becomes a value between pixel Pu and pixel Pd, as shown by an arrow in FIG. 4) is outputted from the selecting section 16 as an interpolated video signal.

Figure 5:
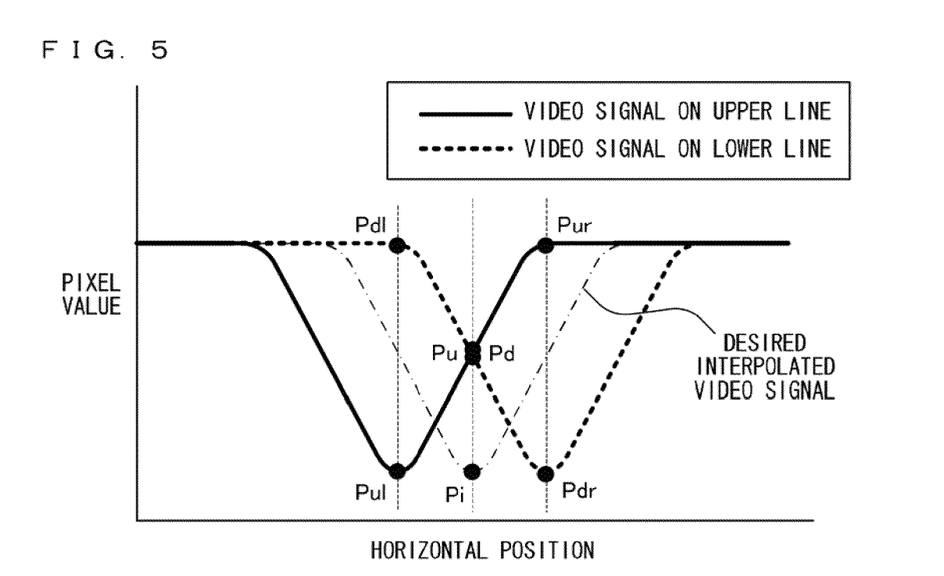
FIG. 5 is a diagram for describing an operation of the scanning line interpolating device when an interpolation-target pixel Pi is located in an intersection area.

Conversely, in the example in FIG. 5 the sign of the difference L (i.e. the value resulting from subtracting the pixel value of pixel Pul from the pixel value of pixel Pdl) is negative, and the sign of the difference R (i.e. the value resulting from subtracting the pixel value of pixel Pdr from the pixel value of pixel Pur) is positive. Therefore, the intersection area detecting section 14 judges that the interpolation-target pixel Pi is located in the intersection area, and as a result, the pixel value outputted from the interpolation processing section 10 (a correct pixel value in this case) is outputted from the selecting section 16 as an interpolated video signal without being compensated by the interpolation value limiting section 12.

As a specific example, a case is described in which a video signal of a scanning line B (interpolated video signal) is generated by a scanning line interpolation process, based on a video signal of a scanning line A (video signal on the upper line) and a video signal of a scanning line C (video signal on the lower line), as both shown in FIG. 13A. In this case, the pixel value outputted from the interpolation processing section 10 will appear as the scanning line B in FIG. 13B. Here, it is assumed that the pixel value of pixel B2 is an incorrect value due to a false operation of the diagonal interpolation process and other pixel values are correct values. On the other hand, the pixel value outputted from the interpolation value limiting section 12 will appear as the scanning line B in FIG. 13C. In FIG. 13C, the pixel value of pixel B2 approaches an ideal value even further than in the case in FIG. 13B, since the pixel value of pixel B2 is compensated by the interpolation value limiting section 12 so as to fall within the interval between the pixel values of the adjacent pixels above and below pixel B2 (i.e. pixel A2 and pixel C2). However, the pixel value of pixel B6 is incorrectly compensated by the interpolation value limiting section 12 so as to fall within the interval between the pixel values of the adjacent pixels above and below pixel B6 (i.e. pixel A6 and pixel C6).

Figure 6:
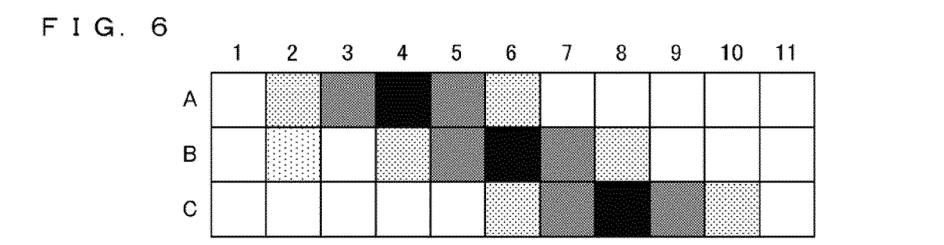
FIG. 6 is a diagram showing a specific example of an interpolated video signal generated by the scanning line interpolating device.

As one example, suppose a case in which the intersection area detecting section 14: calculates the difference L by subtracting the pixel value of pixel Pdl that is the second pixel on the left side from pixel Pd, from the pixel value of pixel Pul that is the second pixel on the left side from pixel Pu which is just above the interpolation-target pixel Pi; and calculates the difference R by subtracting the pixel value of pixel Pdr that is the second pixel on the right side from pixel Pd, from the pixel value of pixel Pur that is the second pixel on the right side from pixel Pu which is just above the interpolation-target pixel Pi. In this case, the intersection area detecting section 14 judges that pixels B5, B6, and B7 are located in the intersection area, and judges that pixels B1, B2, B3, B4, B8, B9, B10, and B11 are not located in the intersection area. As a result, the selecting section 16 selects a pixel value outputted from the interpolation processing section 10 for pixels B5, B6, and B7 (i.e. pixels B5, B6, and B7 in FIG. 13B), and selects a pixel value outputted from the interpolation value limiting section 12 for pixel B1, B2, B3, B4, B8, B9, B10, and B11 (i.e. pixels B1, B2, B3, B4, B8, B9, B10, and B11 in FIG. 13C). As a result, the interpolated video signal outputted from the selecting section 16 will appear as the scanning line B in FIG. 6.

As described above, according to the current embodiment, scanning line interpolation is made possible, which is able of fully exerting the advantageous effect of the diagonal interpolation process while suppressing image quality degradation due to a false operation of the diagonal interpolation process.

In the current embodiment, as described above, the intersection area detecting section 14: judges whether the signs of difference L and difference R are identical or not, and if both signs are identical, judges that the interpolation-target pixel Pi is not located in the intersection area, and if both signs are different, judges that the interpolation-target pixel Pi is located in the intersection area. In this case, for example, in FIG. 4, when the pixel value of pixel Pdl is slightly smaller than the pixel value of pixel Pul, it is judged that the interpolation-target pixel Pi is located in the intersection area, and an incorrect pixel value will be outputted as the interpolated video signal without being compensated. Therefore, in order to avoid such situations, it is preferable that the intersection area detecting section 14 judges not only whether the signs of difference L and difference R are identical or not, but also to judge whether or not the interpolation-target pixel Pi is located in the intersection area by judging whether absolute values of both difference L and difference R are equal to or larger than a threshold S1 (S1 is a value larger than 0). For example, the intersection area detecting section 14 may judge that the interpolation-target pixel Pi is located in the intersection area, when the signs of difference L and difference R are different, and the absolute values of difference L and difference R are both equal to or larger than the threshold S1; and in other cases, may judge that the interpolation-target pixel Pi is not located in the intersection area. By this, a more proper scanning line interpolation process is made possible. An optimum value may be adopted as the value for S1 in accordance with the format of the video signal, the configuration of the interpolation processing section 10, and the like.

As a further alternate example, the intersection area detecting section 14 may judge whether the interpolation-target pixel Pi is located in the intersection area or not, by further judging whether the absolute value of the difference between the pixel value of pixel Pul and the pixel value of pixel Pur (hereinafter, referred to as difference U), and the absolute value of the difference between the pixel value of pixel Pdl and the pixel value of pixel Pdr (hereinafter, referred to as difference D) are both equal to or larger than a threshold S2

(S2 is a value larger than 0). For example, the intersection area detecting section 14 may judge that the interpolation-target pixel Pi is located in the intersection area, when the signs of difference L and difference R are different, the absolute values of difference L and difference R are both equal to or more than the threshold S1, and the absolute values of difference U and difference D are both equal to or more than the threshold S2; and in other cases, may judge that the interpolation-target pixel Pi is not locate in the intersection area.

Figure 7:
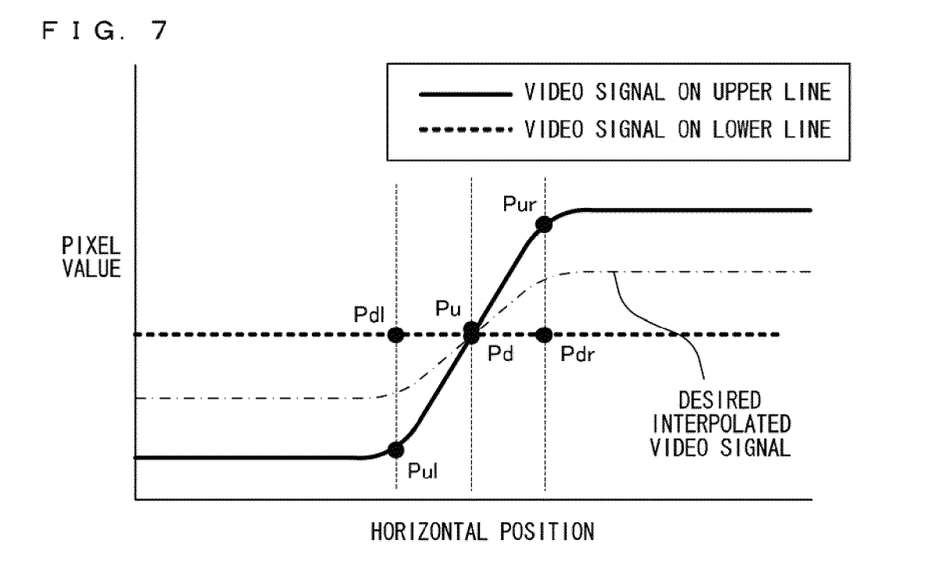
FIG. 7 is a diagram for describing an operation of the scanning line interpolating device according to an alternate example.
Figure 8:
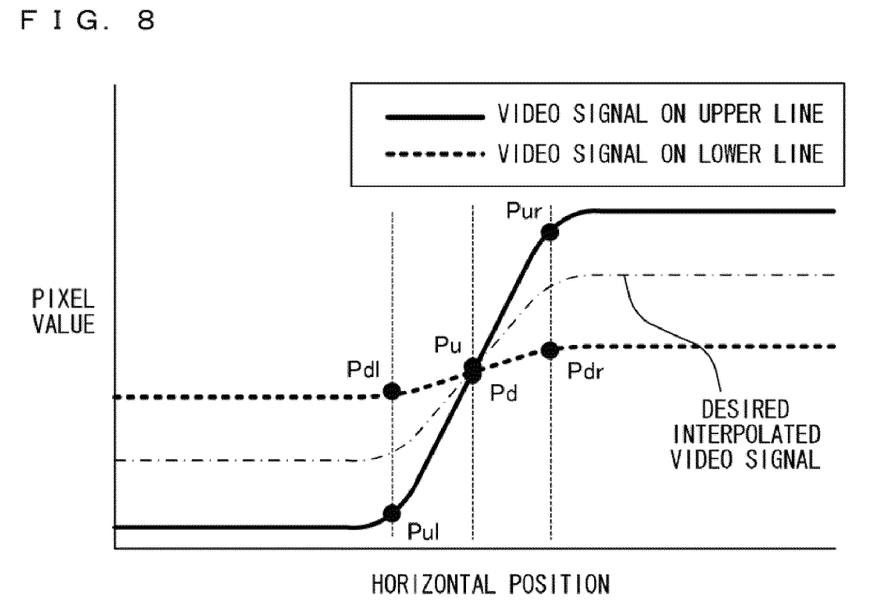
FIG. 8 is a diagram for describing an operation of the scanning line interpolating device according to an alternate example.
Figure 9:
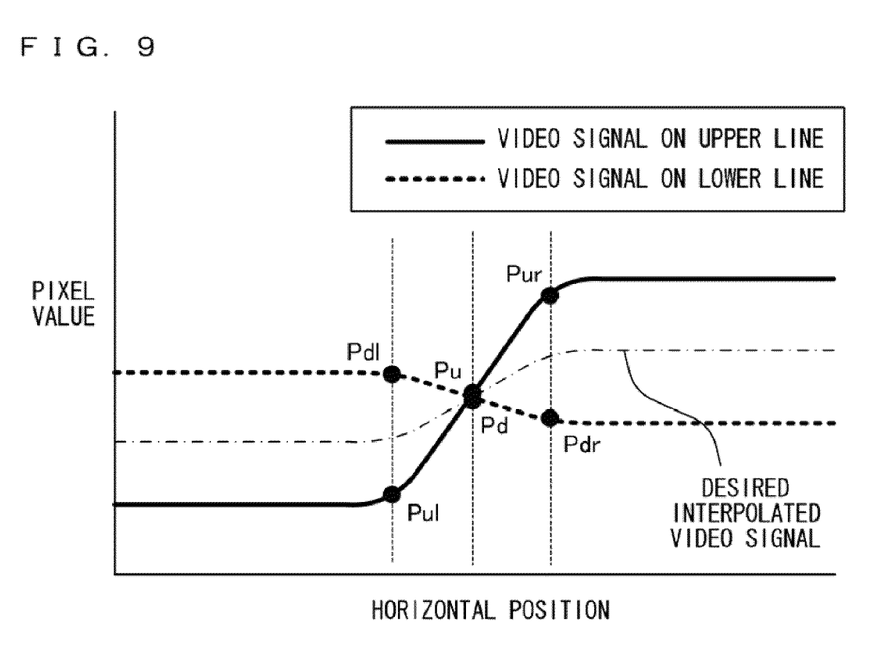
FIG. 9 is a diagram for describing an operation of the scanning line interpolating device according to an alternate example.

For example, when the video signal on the upper line and the video signal on the lower line are as those in FIG. 7, FIG. 8, and FIG. 9: since a diagonal line does not exist in the proximity of the interpolation-target pixel Pi, a desired pixel value of the interpolation-target pixel Pi is one that falls within the interval between the pixel values of adjacent pixels Pu, Pd which are above and below. However, as described above, when judgment of the intersection area is conducted only by the signs and the absolute values of difference L and difference R, in all the cases in FIG. 7, FIG. 8, and FIG. 9, it will be judged that the interpolation-target pixel Pi is located in the intersection area (false operation interval), since the signs of difference L and difference R are different, and the absolute values of difference L and difference R are both equal to or more than the threshold S1. Hence, even if an incorrect pixel value is outputted from the interpolation processing section 10, unfortunately this pixel value will not be compensated.

In the current alternate example, it is judged that the interpolation-target pixel Pi is located in the intersection area, when the signs of difference L and difference R are different, the absolute values of difference L and difference R are both equal to or more than the threshold S1, and the absolute values of difference U and difference D are both equal to or more than the threshold S2. Therefore, in all cases in FIG. 7, FIG. 8, and FIG. 9, it will be judged that the interpolation-target pixel Pi does not locate in the intersection area, since difference D (the difference between the pixel value of pixel Pdl and the pixel value of pixel Pdr) is a relatively small value (smaller than the threshold S2). As a result, if an incorrect pixel value is outputted from the interpolation processing section 10, the interpolation value limiting section 12 functions effectively against this interpolation-target pixel Pi, and its pixel value will be compensate to an interval between the pixel values of adjacent pixels Pu, Pd which are above and below. An optimum value may be adopted as the value for S2 in accordance with the format of the video signal, the configuration of the interpolation processing section 10, and the like.

For the current embodiment, an example has been described in which an interpolated video signal is generated based on video signals of two scanning lines, which are video signals on the upper line and on the lower line. However, the current invention is not limited to this configuration, and the current invention may also be applied to a case in which an interpolated video signal is generated based on video signals from three or more scanning lines.

In the current embodiment, by judging whether or not the interpolation-target pixel is located in an intersection area which is, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects; an interpolation-target pixel that should be a target to be processed by the interpolation value limiting section 12, and an interpolation-target pixel that should be excluded as a target to be processed by the interpolation value limiting section 12 are discriminated. However, the current invention is not limited to this configuration, and the interpolation-target pixel that should be a target to be processed by the interpolation value limiting section 12, and the interpolation-target pixel that should be excluded as a target to be processed by the interpolation value limiting section 12 may be discriminated by other appropriate alternative methods. For example, when the horizontal axis represents a horizontal position and the vertical axis represents a pixel value, by taking into account that a false operation of the interpolation value limiting section 12 is likely to be generated when a curve line, representing pixel values of pixels on the scanning line above (or below) the interpolation-target pixel, has a letter V shape or an inverted letter V shape as in FIG. 12 (this is displayed as a diagonal line); the interpolation-target pixel that is judged not to have a diagonal line in the proximity may be treated as an target to be processed by the interpolation value limiting section 12 (i.e. outputting the pixel value outputted from the interpolation value limiting section 12 as the interpolated video signal), and the interpolation-target pixel that is judged to have a diagonal line in the proximity may be treated not as a target to be processed by the interpolation value limiting section 12 (i.e. outputting the pixel value outputted by the interpolation processing section 10 as the interpolated video signal). Whether a diagonal line exists in the proximity of the interpolation-target pixel or not may be detected by any commonly known methods.

INDUSTRIAL APPLICABILITY

According to the current invention, since scanning line interpolation is made possible, which is able of fully exerting the advantageous effect of the diagonal interpolation process while suppressing image quality degradation due to a false operation of the diagonal interpolation process, the current invention can be suitably applied to, for example, a progressive scan conversion device that converts an interlaced scanned video signal into a progressively scanned video signal.

The invention claimed is:

1. A scanning line interpolating device comprising:
   an interpolation processing unit for determining a pixel value of an interpolation-target pixel based on pixel values of at least two pixels located in a diagonal direction from the interpolation-target pixel;
   an interpolation value limiting unit for compensating the pixel value determined by the interpolation processing unit such that the pixel value of the interpolation-target pixel becomes a value between pixel values of two adjacent pixels above and below the interpolation-target pixel, when the pixel value determined by the interpolation processing unit is outside an interval between the pixel values of the two adjacent pixels above and below the interpolation-target pixel; and
   a false operation preventing unit for preventing false operations of the interpolation value limiting unit by selectively outputting, as an interpolated video signal, the pixel value determined by the interpolation processing unit or the pixel value compensated by the interpolation value limiting unit, based on a pixel value of a pixel on a scanning line above the interpolation-target pixel and a pixel value of a pixel on a scanning line below the interpolation-target pixel,
   wherein the false operation preventing unit includes:
     an intersection area detecting unit for judging whether or not the interpolation-target pixel is located in an intersection area which is, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects; and a selecting unit for, depending on the judgment result of the intersection area detecting unit, outputting, as the interpolated video signal, the pixel value compensated by the interpolation value limiting unit when the interpolation-target pixel is judged not to be located in the intersection area, and for outputting, as the interpolated video signal, the pixel value determined by the interpolation processing unit when the interpolation-target pixel is judged to be located in the intersection area.

2. The scanning line interpolating device according to claim 1, wherein the intersection area detecting unit further judges whether the sign of a first subtraction result value and the sign of a second subtraction result value are identical or not, wherein the sign of the first subtraction result value is a value resulting from subtracting (i) a pixel value of a second pixel located on the scanning line below the interpolation-target pixel and in a horizontal position identical to that of a first pixel from (ii) a pixel value of the first pixel located on the scanning line above the interpolation-target pixel and on the left side of the interpolation-target pixel, wherein the sign of the second subtraction result value is a value resulting from subtracting (i) a pixel value of a fourth pixel located on the scanning line below the interpolation-target pixel and in a horizontal position identical to that of a third pixel from (ii) a pixel value of the third pixel located on the scanning line above the interpolation-target pixel and on the right side of the interpolation-target pixel, and wherein the intersection area detecting unit judges that the interpolation-target pixel is not located in the intersection area if the sign of the first subtraction result value and the sign of the second subtraction result value are identical.

3. The scanning line interpolating device according to claim 2, wherein the intersection area detecting unit judges that the interpolation-target pixel is located in the intersection area (i) if the sign of the first subtraction result value and the sign of the second subtraction result value are different, and (ii) if the absolute value of the first subtraction result value and the absolute value of the second subtraction result value are both equal to or more than a first threshold which is larger than 0.

4. The scanning line interpolating device according to claim 2, wherein the intersection area detecting unit judges that the interpolation-target pixel is located in the intersection area (i) if the sign of the first subtraction result value and the sign of the second subtraction result value are different, (ii) if the absolute value of the first subtraction result value and the absolute value of the second subtraction result value are both equal to or more than a first threshold which is larger than 0, and (iii) if the absolute value of the difference between the first pixel and the third pixel and the absolute value of the difference between the second pixel and the fourth pixel are both equal to or more than a second threshold which is larger than 0.

5. A scanning line interpolation method comprising:

determining a pixel value of an interpolation-target pixel based on pixel values of at least two pixels located in a diagonal direction from the interpolation-target pixel;

compensating the determined pixel value such that the pixel value of the interpolation-target pixel becomes a value between pixel values of two adjacent pixels above and below the interpolation-target pixel, when the determined pixel value is outside an interval between the pixel values of the two adjacent pixels above and below the interpolation-target pixel; and preventing false operations when compensating the determined pixel value by selectively outputting, as an interpolated video signal, the determined pixel value or the compensated pixel value, based on a pixel value of a pixel on a scanning line above the interpolation-target pixel and a pixel value of a pixel on a scanning line below the interpolation-target pixel, wherein the preventing false operations includes:

judging whether or not the interpolation-target pixel is located in an intersection area which is, when the horizontal axis represents a horizontal position and the vertical axis represents a pixel value, an area in proximity of a horizontal position where a curve line, representing pixel values of pixels on the scanning line above the interpolation-target pixel, and a curve line, representing pixel values of pixels on the scanning line below the interpolation-target pixel, intersects; and outputting, as the interpolated video signal, depending on the judgment result, the compensated pixel value when the interpolation-target pixel is judged not to be located in the intersection area, and outputting, as the interpolated video signal, the determined pixel value when the interpolation-target pixel is judged to be located in the intersection area.

6. The scanning line interpolation method according to claim 5, wherein the judging whether or not the interpolation-target pixel is located in the intersection area includes judging whether the sign of a first subtraction result value and the sign of a second subtraction result value are identical or not, wherein the sign of the first subtraction result value is a value resulting from subtracting (i) a pixel value of a second pixel located on the scanning line below the interpolation-target pixel and in a horizontal position identical to that of a first pixel from (ii) a pixel value of the first pixel located on the scanning line above the interpolation-target pixel and on the left side of the interpolation-target pixel, wherein the sign of the second subtraction result value is a value resulting from subtracting (i) a pixel value of a fourth pixel located on the scanning line below the interpolation-target pixel and in a horizontal position identical to that of a third pixel from (ii) a pixel value of the third pixel located on the scanning line above the interpolation-target pixel and on the right side of the interpolation-target pixel, are identical or not, and wherein the judging whether or not the interpolation-target pixel is located in the intersection area judges that the interpolation-target pixel is not located in the intersection area if the sign of the first subtraction result value and the sign of the second subtraction result value are identical.

7. The scanning line interpolation method according to claim 6, wherein the judging whether or not the interpolation-target pixel is located in the intersection area judges that the interpolation-target pixel is located in the intersection area (i) if the sign of the first subtraction result value and the sign of the second subtraction result value are different, and (ii) if the absolute value of the first subtraction result value and the absolute value of the second subtraction result value are both equal to or more than a first threshold which is larger than 0.

8. The scanning line interpolation method according to claim 6, wherein the judging whether or not the interpolation-target pixel is located in the intersection area judges that the interpolation-target pixel is located in the intersection area, (i) if the sign of the first subtraction result value and the sign of the second subtraction result value are different, (ii) if the absolute value of the first subtraction result value and the absolute value of the second subtraction result value are both equal to or more than a first threshold which is larger than 0, and (iii) if the absolute value of the difference between the first pixel and the third pixel and the absolute value of the difference between the second pixel and the fourth pixel are both equal to or more than a second threshold which is larger than 0.

* * * * *